(12) United States Patent
Yamada (10) Patent No.: US 12,306,207 B2
(45) Date of Patent: May 20, 2025

(54) ANEMOMETER

(71) Applicant: Kunimasa Yamada, Hokkaido (JP)

(72) Inventor: Kunimasa Yamada, Hokkaido (JP)

( * ) Notice: Subject to any disclaimer, the term of this patent is extended or adjusted under 35 U.S.C. 154(b) by 335 days.

(21) Appl. No.: 17/796,869

(22) PCT Filed: Jan. 17, 2021

(86) PCT No.: PCT/JP2021/001384
§ 371 (c)(1),
(2) Date: Jan. 18, 2023

(87) PCT Pub. No.: WO2021/153289
PCT Pub. Date: Aug. 5, 2021

(65) Prior Publication Data
US 2023/0146351 A1 May 11, 2023

(30) Foreign Application Priority Data
Feb. 2, 2020 (JP) .................................. 2020-015930

(51) Int. Cl.
*G01P 5/06* (2006.01)

(52) U.S. Cl.
CPC ..................... *G01P 5/065* (2013.01)

(58) Field of Classification Search
CPC ....................................................... G01P 5/065
See application file for complete search history.

(56) References Cited

U.S. PATENT DOCUMENTS 5,117,690 A  6/1992  Baer

FOREIGN PATENT DOCUMENTS

| CN | 205301354 U | 6/2016 | |
|---|---|---|---|
| CN | 109030859 A | 12/2018 | |
| CN | 109057498 A | 12/2018 | |
| CN | 208207000 U | 12/2018 | |
| CN | 209707538 U | 11/2019 | |
| GB | 2260411 A * | 4/1993 | ............. G01P 5/065 |
| IT | MI950127 U1 | 8/1996 | |

(Continued)

OTHER PUBLICATIONS

GB-2260411-A, English Translation (Year: 1993).*

(Continued)

*Primary Examiner* — Ryan D Walsh
(74) *Attorney, Agent, or Firm* — Dennemeyer & Associates LLC (57) ABSTRACT

An anemometer according to the present disclosure includes: a support strut extending in a vertical direction; a rotary member connected to an upper portion of the support strut so as to be rotatable about an axis of the support strut; a swing arm having a proximal end connected to the rotary member and a distal end swingable in the vertical direction; a slider that is slidable along the support strut and is rotatable; a link having one end connected to the swing arm at a position on a more distal end side with respect to the proximal end of the swing arm and having the other end vertically rotatably connected to the slider; a wind receiver provided on at least one of the distal end of the swing arm and the one end of the link and is configured to rotate the rotary member by a wind in a horizontal direction; and a scale attached to a side surface portion of the support strut so as to allow the slider to indicate a wind speed.

4 Claims, 7 Drawing Sheets

(56) References Cited

FOREIGN PATENT DOCUMENTS

| SU | 23649 A1 * | 10/1931 | |
|---|---|---|---|
| WO | WO-2014131819 A2 * | 9/2014 | ................ G01P 5/07 |
| WO | 2014131819 A3 | 10/2014 | |

OTHER PUBLICATIONS

WO-2014131819-A2, English Translation (Year: 2014).*
ITMI950127U1, Italian App with drawings (Int Marketing Company S R L) (Year: 1996).*
ITMI950127U1, English Description (Int Marketing Company S R L) (Year: 1996).*
International Search Report issued in connection with the PCT Application No. PCT/JP2021/001384 dated Feb. 22, 2021.

\* cited by examiner

ANEMOMETER

TECHNICAL FIELD

The present disclosure relates to an anemometer.

BACKGROUND ART

As an anemometer constituted of only a mechanical mechanism, there has been known an anemometer that is formed by simply combining a wind mill mechanism, a centrifugal weight mechanism, and a wind speed indicating mechanism which are independent from each other. For example, Patent Literature 1 describes an anemometer where a rotational speed is estimated by a centrifugal weight mechanism that is separately provided on a rotary shaft that is rotated by a wind mill mechanism, and a wind speed is indicated.

CITATION LIST

Patent Literature

Patent Literature 1: GB 2260411

SUMMARY OF INVENTION

Technical Problem

In the anemometer described above, there may be a case where arms each having a wind receiver and forming constituent elements of the wind mill mechanism extend in a radial direction from the rotary shaft, and the centrifugal weight mechanism and a wind speed indicating mechanism have large widths in the rotary shaft direction. Accordingly, the constituent elements extend at least in two dimensional directions and hence, there exists a problem that the overall configuration of the anemometer cannot be not slimmed.

The present disclosure has been proposed in view of such problems, and it is an object of the present disclosure to provide an anemometer where the overall configuration of the anemometer is slimmed along an axis of rotation when wind receivers of a wind mill mechanism are not rotating.

Solution to Problem

In order to achieve the above-mentioned object, the present disclosure provides the following means.

[1] An anemometer including:
  a support strut having an axis extending in a vertical direction, a connecting portion formed on an upper portion of the support strut;
  a rotary member connected to the connecting portion so as to be rotatable about the axis; and
  a swing arm having a proximal end connected to the rotary member and a distal end swingable in the vertical direction;
  a slider that allows the support strut to pass therethrough and is guided by the support strut, the slider being slidable in the axial direction and being rotatable about the axis;
  a link having one end vertically rotatably connected to the swing arm at a position on a more distal end side with respect to the proximal end of the swing arm, and having the other end vertically rotatably connected to the slider;
  a wind receiver provided on at least one of the distal end of the swing arm and the one end of the link, the wind receiver having a position and an angle with respect to the axis so as to generate a torque for rotating the rotary member in a predetermined direction when receiving wind in a horizontal direction from a front side; and
  a scale attached to a side surface portion of the support strut so as to allow a position of the slider in the axial direction to indicate a wind speed.

[2] The anemometer according to the above-mentioned [1] in which
  the anemometer is used by being attached to a writing instrument,
  the connecting portion is a cap that has a center axis extending in the vertical direction with an open end facing downward, the writing instrument that serves as the support strut when mounted being detachably mounted on the cap,
  the anemometer further comprises a seal having an adhesive surface on one side, and
  the scale is printed on the seal and is applied by attaching the adhesive surface of the seal.

[3] The anemometer according to the above-mentioned [1] or [2], in which
  the wind receiver is provided at the distal end of the swing arm.

[4] The anemometer according to the above-mentioned [1] or [2], in which
  the wind receiver is provided at the one end of the link, and
  the one end of the link is connected to the distal end of the swing arm.

Advantageous Effects of Invention

As described above, according to the present disclosure, the overall configuration of the anemometer is slimmed along the axis of the support strut when the wind receiver is not rotating, it is possible to provide an anemometer that can be stored in a space-saving manner.

DESCRIPTION OF EMBODIMENTS

Hereinafter, embodiments of the present disclosure will be described in detail with reference to drawings.

First Embodiment

First, as a first embodiment of the present disclosure, for example, an anemometer 1A illustrated in FIG. 1 to FIG. 3 will be described.

Figure 1:
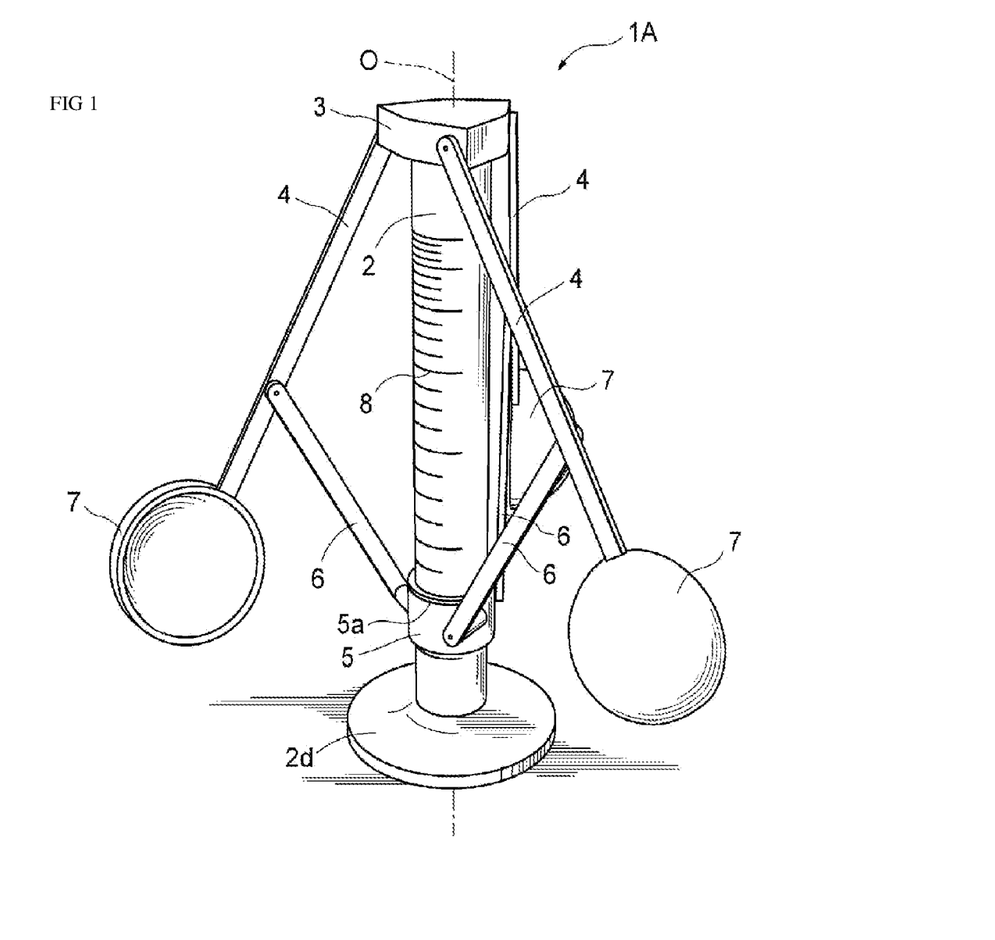
FIG. 1 is a perspective view illustrating an anemometer according to a first embodiment.
Figure 2:
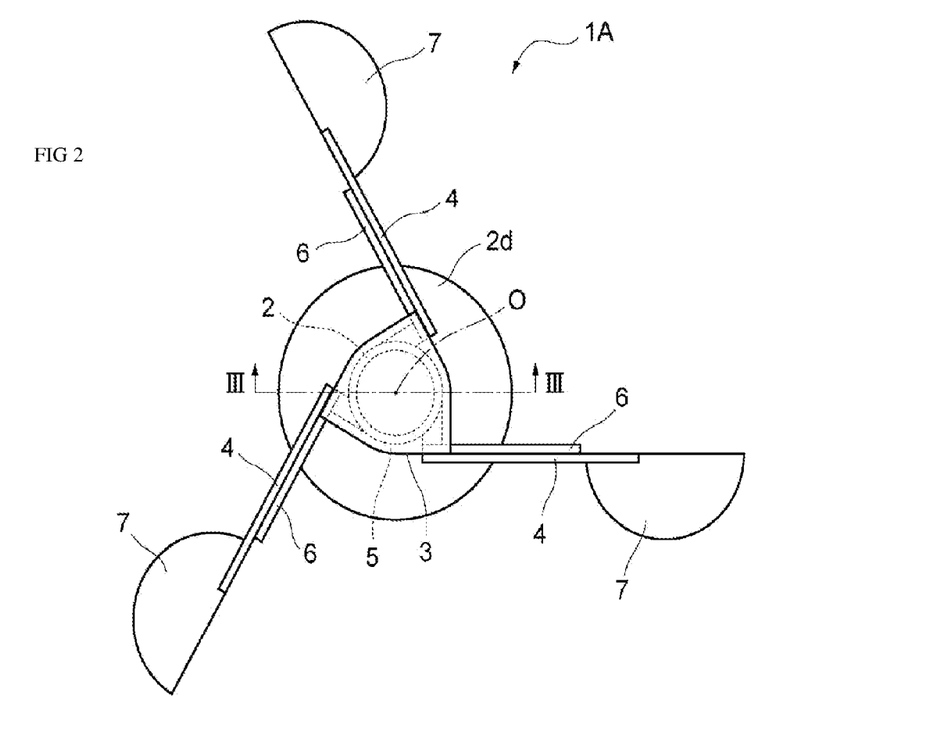
FIG. 2 is a top plan view illustrating the anemometer according to the first embodiment.
Figure 3:
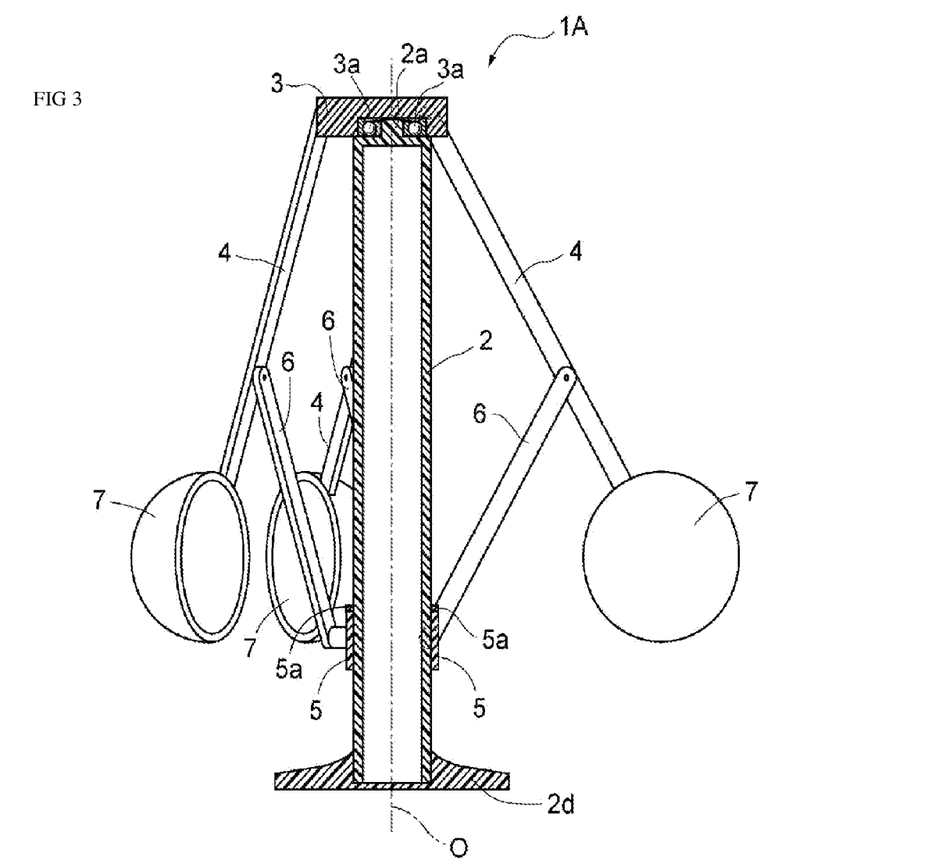
FIG. 3 is a cross-sectional view of the anemometer taken along line in FIG. 2.

As illustrated in FIG. 1 to FIG. 3, the anemometer 1A of the present embodiment schematically includes a support strut 2, a rotary member 3, swing arms 4, a slider 5, links 6, wind cups 7 (wind receivers), and a scale 8.

The support strut 2 has a circular columnar shape. The support strut 2 has a center axis O (hereinafter, simply referred to as an axis O, and the rotation about the axis O may be simply referred to as "rotation") and the axis O extends in the vertical direction. For example, in the present embodiment, the support strut 2 includes a pedestal 2d at a lower end thereof. The lower end of the support strut 2 may have a cap shape so that a pencil is attachable to the support strut 2, and may be attachable to a commercially available pencil. In the present embodiment, the support strut 2 has a connecting portion 2a at an upper end thereof, and the connecting portion 2a has a shape capable of being fitted into an inner race of a bearing 3a.

The rotary member 3 is connected to the connecting portion 2a by way of the bearing 3a. In the present embodiment, the rotary member 3 is fixed to an outer race of the bearing 3a and is rotatable about the axis O. The bearing 3a may be formed integrally with at least one of the rotary member 3 and the connecting portion 2a.

The swing arm 4 has a rod shape. A proximal end of the swing arm 4 is pivotally supported by a side surface portion of the rotary member 3, and the swing arm 4 is swingable in the vertical direction. Hereinafter, an angle made by the swing arm 4 and the axis O may be also referred to as a swing angle. A length of the swing arm 4 is adjusted such that the swing arm 4 does not come into contact with a floor or the pedestal 2d when the swing arm 4 swings.

The slider 5 is a cylindrical member having an inner diameter such that the slider 5 is fitted on the support strut 2. The slider 5 is guided by the support strut 2, is slidable in the axis O direction, and is rotatable about the axis O. For example, in the present embodiment, the slider 5 has an indication line 5a at an upper end thereof.

The link 6 has a rod shape. One end of the link 6 is pivotally supported by an intermediate portion of the swing arm 4 such that the other end of the link 6 is rotatable in the vertical direction. The other end of the link 6 is pivotally supported by an outer surface portion of the slider 5 such that the one end of the link 6 is rotatable in the vertical direction. The link 6 preferably has a length in the longitudinal direction that allows the swing arm 4 to swing widely. Further, with respect to the position at which the one end of the link 6 is pivotally supported by the swing arm 4, the position may be located on a distal end side with respect to the proximal end except for the proximal end of the swing arm 4 since it is sufficient that a change in a swing angle is converted into a displacement of the slider 5.

The wind cup 7 is provided at the distal end of the swing arm 4. The position and the angle of the wind cup 7 with respect to the axis O are set such that, when the wind cup 7 receives wind in the horizontal direction from the front side, a torque for rotating the rotary member 3 in a predetermined direction is generated. When the wind cup 7 receives the wind in the horizontal direction from the front side, the torque is an outer product of a position vector indicating a position of the wind cup 7 in the radial direction from the axis O and a drag vector facing the rear side of the wind cup 7. In particular, the position and the angle of the wind cup 7 with respect to the axis O are set such that the torque is generated even when the swing arm 4 is suspended vertically without rotating. As a result, the stationary swing arm 4 can start its rotation by wind. For this end, first, the wind cup 7 is disposed away from the axis O in the radial direction with a slight distance. For example, in the present embodiment, the proximal end of the swing arm 4 is pivotally supported at a position on the rotary member 3 away from the axis O in the radial direction with a slight distance and hence, the position of the wind cup 7 with respect to the axis O when the wind cup 7 is not rotating is adjusted. Due to the above-mentioned slight distance, it is possible to prevent a magnitude of the position vector from becoming excessively small. Secondly, the wind cup 7 is directed in a substantially circumferential direction with respect to the axis O. For example, in the present embodiment, the direction of the wind cup 7 is adjusted by setting the angle at which the wind cup 7 is mounted on the distal end of the swing arm 4. Due to such adjustment, the drag vector is increased and, at the same time, the sine of the angle between the drag vector and the position vector is increased.

Further, it is preferable that the direction of the wind cup 7 be perpendicular to a swing plane of the swing arm 4 to which the wind cup 7 is connected. With such a configuration, the drag generated by the wind acting on the wind cup 7 does not directly contribute to swinging of the swing arm 4 to which the wind cup 7 is connected, but contributes to rotating the swing arm 4. As a result, the swing arm 4 has a swing angle corresponding to a rotational speed. Further, the wind cup 7 is directed in the substantially circumferential direction with respect to the axis O regardless of the swing angle.

The scale 8 is a scale for indicating a wind speed, and is imprinted on a side surface portion of the support strut 2. The scale 8 is formed corresponding to an actual measurement value of the wind speed such that the position of the indication line 5a in the axis O direction indicates the wind speed.

Two further similar swing arms 4 that are connected to the slider 5 by way of the links 6 as described above are respectively connected to the rotary member 3 in substantially the same manner as the above-mentioned swing arm 4. Three swing arms 4 are respectively disposed three-fold symmetrically with respect to the axis O. With such a configuration, each of all wind cups 7 has the position and the angle with respect to the axis O such that, when the wind cup 7 receives wind in the horizontal direction from the front side, a torque that rotates the rotary member 3 in a predetermined direction is generated.

The anemometer 1A according to the present embodiment has the above-mentioned configuration. The manner of operation of the anemometer 1A is described hereinafter. When the swing arm 4 is not rotating, the swing arm 4 does not receive a centrifugal force and hence, the swing arm 4 is suspended along the support strut 2. When the wind cup 7 receives the wind in the horizontal direction, the swing arm 4 starts to rotate integrally with the rotary member 3, the link 6, and the slider 5. The swing arm 4 rotates at a rotational speed corresponding to the wind speed, receives a centrifugal force corresponding to the rotational speed, and has a swing angle corresponding to the centrifugal force. The slider 5 is connected to the swing arm 4 by the link 6 and hence, the slider 5 slides along the support strut 2 corresponding to the swing angle. The wind speed is visually recognized by the position of the indication line 5a on the scale 8.

Here, as a first comparative example, a conventional anemometer is considered where a rotational speed is estimated by a centrifugal weight mechanism that is additionally provided on a rotary shaft that is rotated by a wind mill mechanism, and a wind speed is indicated accordingly. In the anemometer of this comparative example, as constituent elements of the wind mill mechanism, a plurality of arms each radially extending and having a wind receiver are fixed to the rotary shaft. Further, the centrifugal weight mechanism has a large width in the direction of the axis of rotation. Accordingly, the anemometer of this comparative example has the overall configuration where the constituent elements extend at least in two-dimensional directions.

On the other hand, in the present embodiment, the rotary member 3 and the swing arms 4 that are pivotally supported by the rotary member 3 also function as the wind mill mechanism and the centrifugal weight mechanism of the anemometer of the comparative example. Accordingly, when the swing arms 4 are not rotating, the swing arms 4 are suspended along the support strut 2 and hence, the portion that plays a role of the wind mill mechanism can be slimmed. Further, the links 6, the slider 5, and the scale 8 attached to the support strut 2 are respectively arranged along the axis O.

With such a configuration, when the wind cups 7 are not rotating, the overall configuration of the anemometer of the present embodiment is slimmed along the axis O.

In particular, according to the configuration of the present embodiment, mechanisms used only for slimming the entire configuration of the anemometer are not additionally provided at all, and the anemometer is formed of only the necessary minimum mechanisms. Nevertheless, all mechanisms are combined in a comprehensive manner and hence, the present embodiment has succeeded in creating the mechanism where the entire configuration of the anemometer can be slimmed along the axis O.

In addition, the anemometer 1A of the present embodiment has fewer constituent elements compared to the anemometer of the comparative example due to the dual use of the mechanisms as described above. Accordingly, the mechanisms are simplified, a manufacturing cost is reduced and, at the same time, the turbulence of the flow of the wind generated by the constituent members can be suppressed.

Further, as a second comparative example, a conventional anemometer that includes a wind mill mechanism is considered. In the conventional anemometer, a proximal end of an arm having a wind receiver, that is a constituent element of the wind mill mechanism, is pivotally supported by a rotation shaft, and the arm having the wind receiver is foldable in a direction of a rotary shaft. According to the anemometer of this comparative example, when the anemometer is not used, the arms each having the wind receiver are foldable along the rotation shaft and hence, the windmill mechanism portion can be slimmed. However, in the anemometer of this comparative example, when the anemometer is started to be used, it is necessary to perform a manipulation of raising the arms each having the wind receiver from a folded state in the radial direction along the rotation shaft direction and to lock the arms in a raised state. Further, it is necessary to provide a mechanism that can raise the arms each having the wind receiver in the radial direction, can lock the arms, and can release the locking of the arms.

On the other hand, in the present embodiment, the swing angle is naturally formed by a wind speed and hence, it is not necessary to set the swing angle by a manipulation.

Accordingly, in the anemometer 1A of the present embodiment, although the swing arm 4 has the folding mechanism, it is not necessary to perform a manipulation of raising the swing arm 4 in a radial direction and locking the swing arm 4 when the anemometer 1A is started to be used. Further, it is not necessary to provide a mechanism that can raise the arm 4 in the radial direction, can lock the arm 4 in a raised state, and can release such locking of the arm 4.

Second Embodiment

Figure 4:
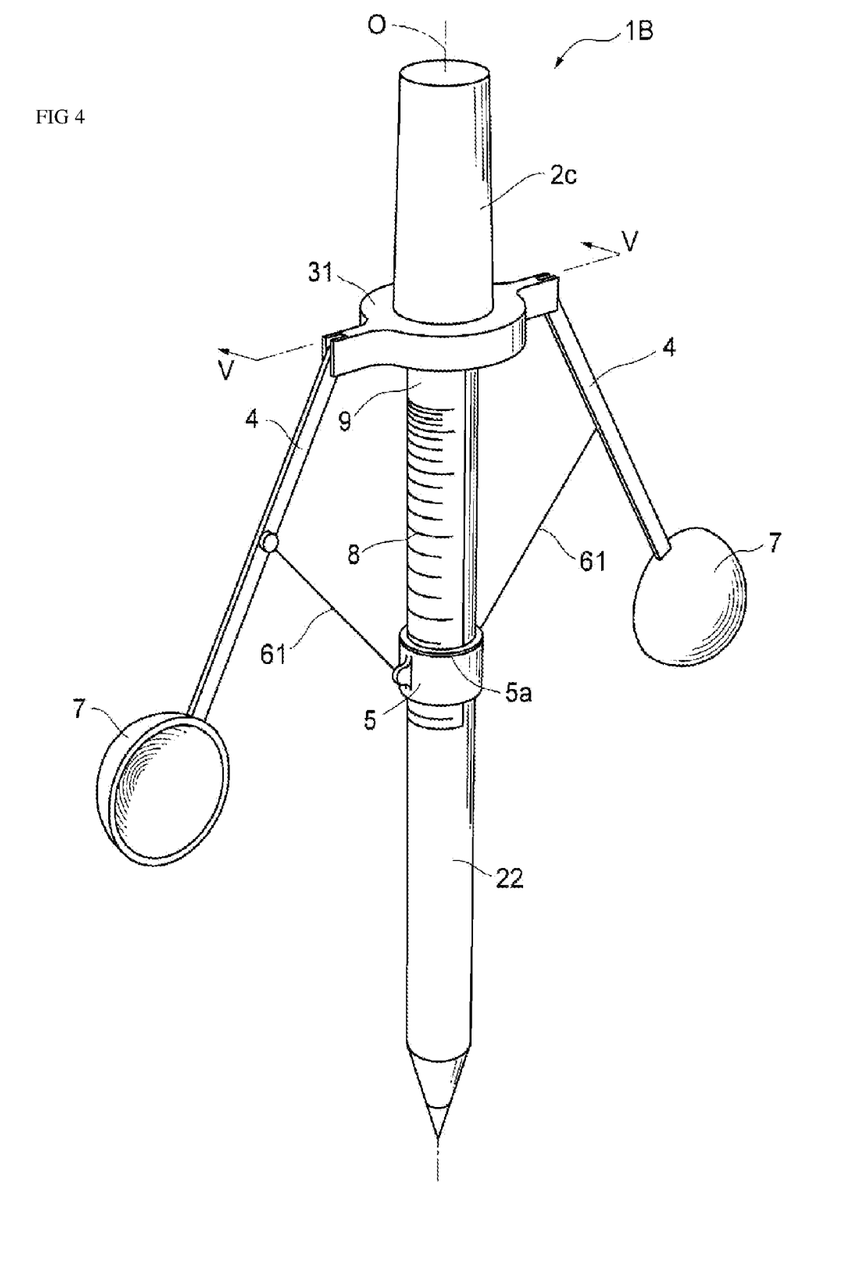
FIG. 4 is a perspective view illustrating an anemometer according to a second embodiment.
Figure 5:
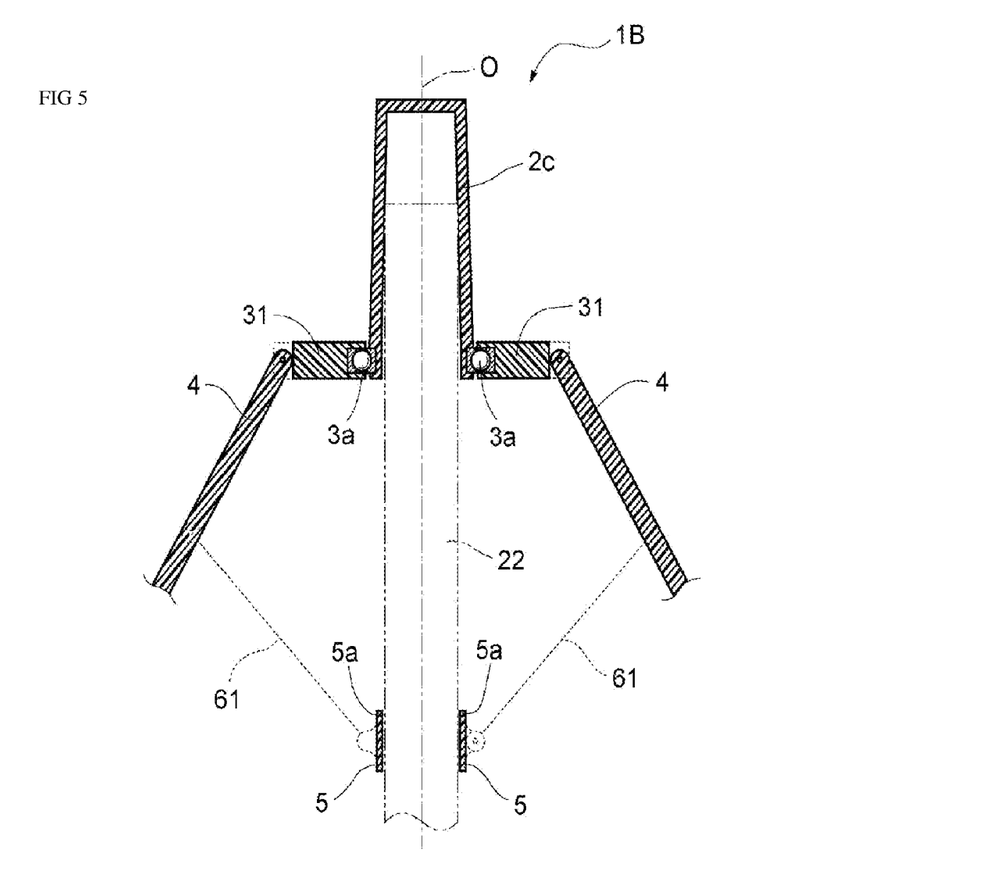
FIG. 5 is a cross-sectional view illustrating a part of the anemometer taken along line V-V in FIG. 4.

Next, as a second embodiment of the present disclosure, for example, an anemometer 1B illustrated in FIG. 4 to FIG. 5 is described. In the following description, the description of parts substantially equal to the corresponding parts of the above-mentioned anemometer 1A is omitted, and these parts are given the same symbols in the drawings.

The anemometer 1B according to the present embodiment mainly differs from the anemometer 1A according to the first embodiment with respect to the following points. That is, in the anemometer 1A according to the first embodiment, in place of the support strut 2 which has the connecting portion 2a at the upper end thereof and has the side surface portion on which the scale 8 is attached, the anemometer 1B according to the present embodiment includes: a cap 2c; and a seal 9 printed with a scale 8 that is made to adhere to a commercially available pencil 22 (writing instrument) when the pencil 22 is attached to the cap 2c from below. The configurations other than the configuration described below are substantially equal to the corresponding configurations in the first embodiment.

As illustrated in FIG. 4 to FIG. 5, the anemometer 1B of the present embodiment schematically includes the cap 2c, a rotary member 31, swing arms 4, a slider 5, links 61, wind cups 7 (wind receiver), the seal 9, and the scale 8.

The cap 2c is a cap-shaped member in which an end portion of the pencil 22 is detachably mountable. An open end of the cap 2c faces downward, and a center axis O (hereinafter, simply referred to as an axis O) of the cap 2c extends in the vertical direction. It is preferable that, in a case where the commercially available pencil 22 is mounted in the cap 2c, the cap 2c perform a function of the support strut 2 in the first embodiment, and be longer than the swing arm 4 so that a user can use the anemometer 1B by holding a lower portion of the pencil 22 by his/her hand.

The rotary member 31 is an annular member that is externally fitted on the cap 2c, and is connected to the cap 2c by way of a bearing 3a. An inner race of the bearing 3a is fixed to the cap 2c, an outer race of the bearing 3a is fixed to the rotary member 31, and the rotary member 31 is rotatable about the axis O. When the pencil 22 is mounted in the cap 2c, a center axis of the pencil 22 and a rotation axis of the bearing 3a respectively agree with the axis O.

The slider 5 is a cylindrical member having an inner diameter capable of allowing fitting of the slider 5 on the pencil 22 that is mountable in the cap 2c. In the present embodiment, it is preferable that the rotary member 31 be connected to a lower portion of the cap 2c so that the cap 2c does not obstruct the sliding of the slider 5.

In the present embodiment, the link 61 may be a deformable member, and is a thin wire. One end of the link 61 is connected to an intermediate portion of the swing arm 4, and the other end of the link 61 is connected to an outer surface portion of the slider 5. It is preferable that the link 61 have a length that allows the swing arm 4 to swing in a wide range. Further, with respect to the position at which the one end of the link 61 is connected to the swing arm 4, it is sufficient that a change in swing angle is converted into a displacement of the slider 5. Accordingly, it is sufficient that the position be located on a distal end side with respect to a proximal end of the swing arm 4 except for such a proximal end.

Another one similar swing arm 4 connected to the slider 5 by way of the link 61 is connected to the rotary member 31 in substantially the same manner as the above-mentioned swing arm 4. Two swing arms 4 are disposed symmetrically with respect to the axis O.

The seal 9 is a thin seal where printing can be made on a front surface, and an adhesive surface is formed on a back surface. The scale 8 is printed on the front surface of the seal 9. The adhesive surface of the seal 9 can be made to adhere to a side surface portion of the pencil 22 such that an indication line 5a of the slider 5 sliding along the pencil 22 when the pencil 22 is mounted in the cap 2c indicates a wind speed. Accordingly, the seal 9 is made to adhere to the side surface portion of the pencil 22 when the pencil 22 is mounted in the cap 2c in such a manner that the position of the indication line 5a in the axis O direction when the wind cup 7 is not rotating and a zero point of a wind speed on the scale 8 are aligned with each other, and values of the scale 8 are increased in the upward direction. The seal 9 may be formed such that the position at which the seal 9 is made to adhere to the pencil 22 can be determined by adhering the seal 9 to the side surface portion of the pencil 22 when the pencil 22 is mounted in the cap 2c in a state where an upper end of the seal 9 is aligned with a lower end of the cap 2c.

The anemometer 1B of the present embodiment has substantially the same structure as the anemometer 1A of the first embodiment by mounting the commercially available pencil 22 in the cap 2c and by making the seal 9 adhere to the side surface portion of the pencil 22 such that the value of the scale 8 designated by the indication line 5a indicates a wind speed. Accordingly, the anemometer 1B of the present embodiment functions in the same manner as the anemometer 1A.

Hereinafter, a composite body constituted of the cap, the rotary member, the swing arms, the slider, the links, and the wind cups (excluding the pencil 22, the seal 9, and the scale 8) may be referred to as a "main body portion".

With such a configuration, the anemometer 1B can acquire substantially the same advantageous effects as the anemometer 1A of the first embodiment.

Further, the anemometer 1B of the present embodiment has the configuration where the support strut 2 which is the longest constituent element in the anemometer 1A of the first embodiment is substituted by the cap 2c and the commercially available pencil 22 where the seal 9 is made to adhere to the side surface portion of the pencil 22 when the pencil 22 is mounted in the cap 2c. With such a configuration, a use can remove the pencil 22 from the cap 2c and can store the pencil 22 in a storage place in his/her writing instrument. Accordingly, the main body portion of the anemometer 1B can be made small-sized and light-weighted compared to the anemometer 1A of the first embodiment, and can be stored in a different place.

Further, according to the anemometer 1B of the present embodiment, due to the substitution by the pencil 22 described above, it is possible to reduce a manufacturing cost compared to a case where the anemometer is manufactured with the configuration of the first embodiment.

Still further, the anemometer 1B of the present embodiment is formed in a small-sized shape matching with the pencil 22 and hence, the anemometer 1B can be used as an accessory. In this case, the anemometer 1B is not required to have high accuracy as a measuring instrument.

Third Embodiment

Next, as a third embodiment of the present disclosure, for example, an anemometer 1C illustrated in FIG. 6 will be described. In the following description, the description of parts substantially equal to the corresponding parts of the above-mentioned anemometer 1A is omitted, and these parts are given the same symbols in the drawings.

The anemometer 1C of the present embodiment mainly differs from the anemometer 1A of the first embodiment with respect to the following point. In the anemometer 1C, a wind cup is provided at one end of a link instead of being mounted on the distal end of the swing arm, and the one end of the link is connected to a distal end portion of a swing arm instead of being connected to the intermediate portion of the swing arm. The configurations other than the configuration described below are substantially equal to the corresponding configurations in the first embodiment.

Figure 6:
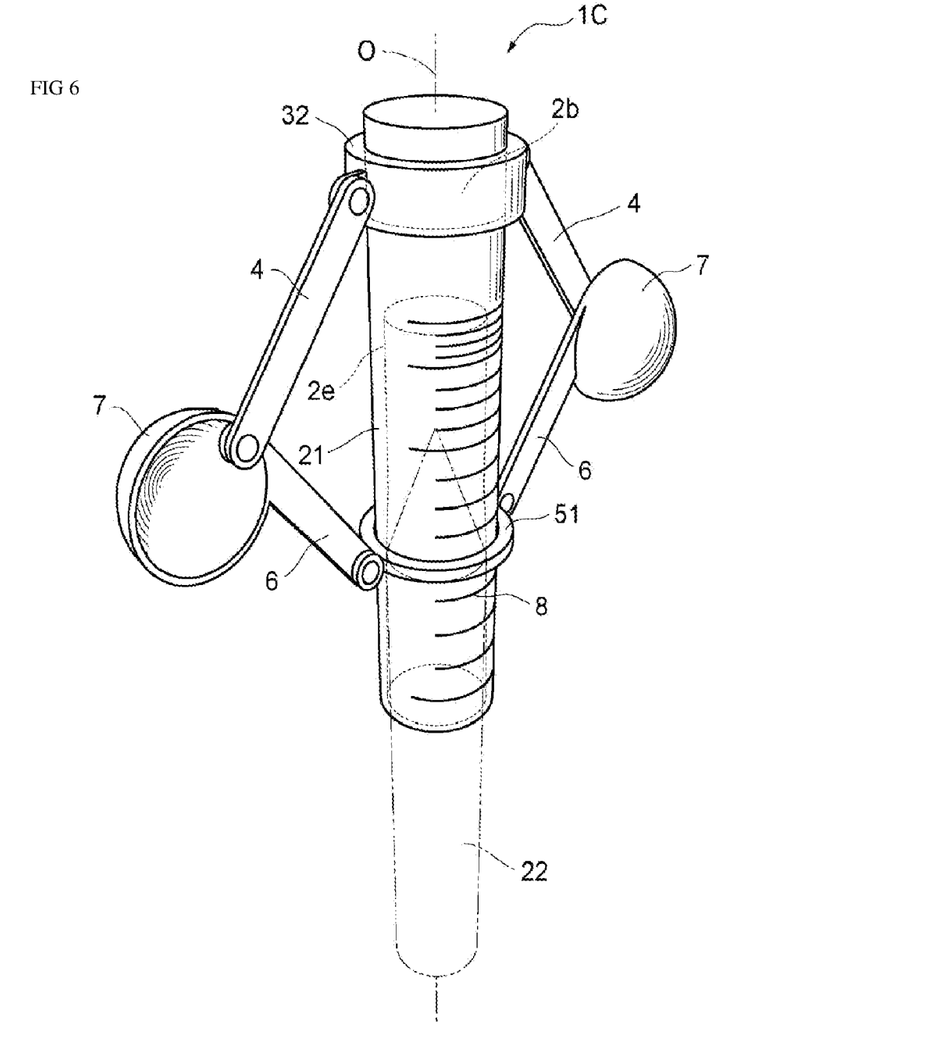
FIG. 6 is a perspective view illustrating an anemometer according to a third embodiment.

As illustrated in FIG. 6, the anemometer 1C of the present embodiment schematically includes a support strut 21, a rotary member 32, swing arms 4, a slider 51, links 6, wind cups 7 (wind receivers), and a scale 8.

The support strut 21 has a circular columnar shape as an external profile. A center axis O of the support strut 21 (hereinafter simply referred to as an axis O) extends in the vertical direction. For example, in the present embodiment, the support strut 21 has a cap shape 2e where a pencil 22 is detachably mountable in the support strut 21 from a lower end of the support strut 21. The support strut 21 is mountable on a commercially available pencil 22. In the present embodiment, an inner race of a bearing (not illustrated in the drawing) has an inner diameter that allows external fitting of the bearing on the support strut 21. A connecting portion 2b is a portion to which the inner race of the bearing on an upper side of the support strut 21 is fixed.

The rotary member 32 is an annular member that is externally fitted on the support strut 21. The inner race of the bearing is fixed to the connecting portion 2b, and an outer race of the bearing is fixed to an inner side surface portion of the rotary member 32, and the rotary member 32 is rotatable about the axis O.

The slider 51 is an annular member having an inner diameter that allows external fitting of the slider 51 on the support strut 21. The slider 51 is guided by the support strut 21, is slidable in the axis O direction, and is rotatable about the axis O.

One end of the link 6 is pivotally supported by a distal end portion of the swing arm 4 such that the other end of the link 6 is rotatable in the vertical direction, and the other end of the link 6 is pivotally supported by an outer side of the slider 51 such that the one end of the link 6 is rotatable in the vertical direction.

The wind cup 7 is provided at the one end of the link 6. The wind cup 7 may be pivotally provided on a shaft at the one end of the link 6. In the present embodiment, the one end of the link 6 is pivotally supported by the distal end portion of the swing arm 4 and hence, the wind cup 7 is positioned at the distal end portion of the swing arm 4 and rotates integrally with the swing arm 4. Therefore, the position and the angle of the wind cup 7 with respect to the axis O can be set in the same manner as the first embodiment.

The scale 8 is formed corresponding to an actual measurement value of a wind speed so that the position of the slider 51 in the axis O direction indicates the wind speed.

The anemometer 1C of the present embodiment is used in a state where a user mounts a commercially available pencil 22 in the support strut 21 from below and the user uses the anemometer 1C by holding the pencil 22 with his/her hand. The anemometer 1C of the present embodiment has substantially the same external profile as the anemometer of the first embodiment although the one end of the link 6 is pivotally supported by the distal end portion of the swing arm 4 instead of being pivotally supported by the intermediate portion of the swing arm 4. Accordingly, the anemometer 1C acts in the same manner as the anemometer 1A.

With such a configuration, the anemometer 1B can acquire substantially the same advantageous effects as the anemometer 1A of the first embodiment.

Fourth Embodiment

Next, as a fourth embodiment of the present disclosure, for example, an anemometer 1D illustrated in FIG. 7 will be described. In the following description, the description of parts substantially equal to the corresponding parts of the above-mentioned anemometer 1B is omitted, and these parts are given the same symbols in the drawings.

The anemometer 1D of the present embodiment mainly differs from the anemometer 1B of the second embodiment with respect to the following points. A wind cup is provided on a distal end of a link instead of a distal end of a swing arm, and one end of the link is connected to a distal end portion of the swing arm instead of being connected to an intermediate portion of the swing arm. The configurations other than a configuration described hereinafter are substantially equal to the corresponding configurations of the second embodiment.

Figure 7:
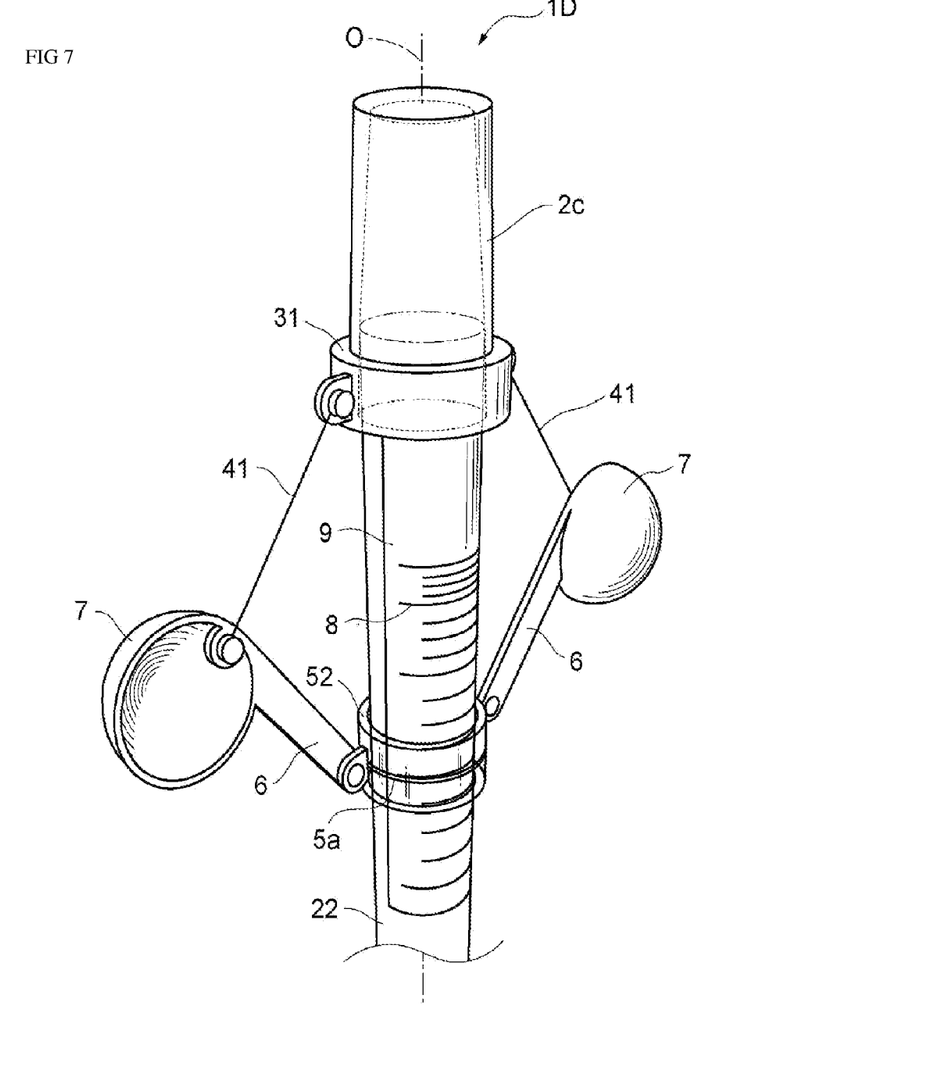
FIG. 7 is a perspective view illustrating an anemometer according to a fourth embodiment.

As illustrated in FIG. 7, the anemometer 1D of the present embodiment schematically includes a cap 2c, a rotary member 31, swing arms 41, a slider 52, links 6, wind cups 7 (wind receivers), a seal 9, and a scale 8.

In the present embodiment, the swing arm 41 may be a deformable member and is a thin wire. A proximal end of the swing arm 41 is connected to an outer surface portion of the rotary member 31.

The slider 52 is a cylindrical member having an inner diameter that allows external fitting of the slider 52 on a pencil 22 (writing instrument) that is mountable on the cap 2c. The slider 52 is made of a material having light transmissivity. The slider 52 is guided by the pencil 22 when the pencil 22 is mounted in the cap 2c, is slidable in the axis O direction, and is rotatable about the axis O. For example, in the present embodiment, the slider 52 has an indication line 5a at an intermediate portion, and the indication line 5a indicates a value of the scale 8 that is viewed in a see-through manner.

The link 6 has a rod shape. One end of the link 6 is connected to a distal end portion of the swing arm 41, and the other end of the link 6 is pivotally supported by an outer side surface portion of the slider 52 such that the link 6 is rotatable in the vertical direction.

The anemometer 1D of the present embodiment has substantially the same structure as the anemometer 1C of the third embodiment by mounting the commercially available pencil 22 in the cap 2c and by making the seal 9 adhere to the side surface portion of the pencil 22 such that a value of the scale 8 designated by the indication line 5a indicates a wind speed. Accordingly, the anemometer 1D of the present embodiment functions in the same manner as the anemometer 1C.

With such a configuration, the anemometer 1D can acquire substantially the same advantageous effects as the anemometer 1A of the first embodiment and the anemometer 1B of the second embodiment.

The present disclosure is not limited to the above-mentioned embodiments, and includes modifications within the scope of achieving the object of the present disclosure.

Further, the above-described configurations can be appropriately combined with each other within a range not contradictory to each other.

For example, in the embodiment, the description has been made with respect to an example in which movable portions at respective parts are freely moved. However, the increase of a rotational speed may be suppressed by replacing the bearing with a bearing with rotational resistance. Further, it may be configured to suppress the increase of a swing angle by making at least one of the slider, the swing arm, and the link receive an elastic force of an elastic body. With such a configuration, the increase of a swing angle is suppressed by an elastic force instead of the gravity. Accordingly, the anemometer may be an anemometer that can be used even in a state where an angle or a direction of the axis O is set different from those of the embodiments.

In the embodiment, the description has been made with respect to the example where the number of swing arms is set to two to three. However, the number of swing arms is not limited two or three. That is, it is preferable that the number of swing arms be two or more. Further, some of the swing arms may have the configuration that has no link. Still further, in the embodiment, the description has been made with respect to the example where the wind receiver is a wind-cup-type wind receiver. However, the wind receiver may have other shapes used for a vertical-type wind mill.

In the embodiment, the description has been made with respect to the example where the one end of the link is connected to the fixed position of the swing arm. However, the one end of the link may be connected to any one of a plurality of portions of the swing arm in the longitudinal direction in a switchable manner. In this case, scales corresponding to respective switchable connecting portions are formed parallel to the connecting portions, or the scale is attached by changing the attaching positions.

Further, in the embodiment, the description has been made with respect to the example where the constituent elements are connected to each other by pivotal supporting using a shaft. However, the constituent elements may be connected to each other using a deformable member.

Still further, in the embodiment, the description has been made with respect to the example where a magnitude of the position vector described above is adjusted by the position at which the proximal end of the swing arm is pivotally supported by the rotary member. However, the adjustment method of the magnitude of the position vector is not limited to such a method. For example, a magnitude of the position vector may be adjusted such that the swing angle does not take a zero angle even when a movable range of the swing angle is limited so that the swing arm is not rotating.

Further, there are some embodiments where the description has been made with respect to an example where a commercially available pencil is mounted on the anemometer. However, in these embodiments, writing instruments in general may be mounted on the anemometer. Alternatively, the anemometer may be mounted on a writing instrument. In this case, a scale may be applied to the writing instrument.

In the second and fourth embodiments, the anemometer 1B and the anemometer 1D may be used as a teaching material in such a manner that an incomplete scale where some or all of the scale lines and numerical values that indicate wind speeds are not printed is adopted instead of a scale printed on the seal, and a user can complement the incomplete scale portion based on an actual measurement.

Further, the description has been made with respect to the example where the anemometer of the embodiment is used for measuring a wind speed. However, the anemometer of the embodiment may be used for measuring flow velocities of fluids in general.

REFERENCE SIGNS LIST 2, 21 support strut
22 pencil (writing instrument)
2a, 2b connecting portion
2c cap
3, 31, 32 rotary member
4, 41 swing arm
5, 51, 52 slider
6, 61 link
7 wind cup (wind receiver)
8 scale
9 seal
O axis

The invention claimed is:

1. An anemometer comprising:
a support strut having an axis extending in a vertical direction, a connecting portion formed on an upper portion of the support strut;
a rotary member connected to the connecting portion so as to be rotatable about the axis;
a swing arm having a proximal end connected to the rotary member and a distal end swingable in the vertical direction;
a slider that allows the support strut to pass therethrough and is guided by the support strut, the slider being slidable in the axial direction and being rotatable about the axis;
a link having one end vertically rotatably connected to the swing arm at a position on a more distal end side with respect to the proximal end except for the proximal end of the swing arm, and having the other end vertically rotatably connected to the slider;
a wind receiver provided on at least one of the distal end of the swing arm and the one end of the link, the wind receiver having a position and an angle with respect to the axis so as to generate a torque for rotating the rotary member in a predetermined direction when receiving wind in a horizontal direction from a front side; and
a scale attached to a side surface portion of the support strut so as to allow a position of the slider in the axial direction to indicate a wind speed.

2. The anemometer according to claim 1, wherein
the anemometer is used by being attached to a writing instrument,
the connecting portion is a cap that has a center axis extending in the vertical direction with an open end facing downward, and the cap is capable of being detachably mounted to the writing instrument that serves as the support rut when mounted on the cap,
the anemometer further comprises a seal having an adhesive surface on one side, and
the scale is printed on the seal and is applied by attaching the adhesive surface of the seal.

3. The anemometer according to claim 1 or 2, wherein the wind receiver is provided at the distal end of the swing arm.

4. The anemometer according to claim 1 or 2, wherein the wind receiver is provided at the one end of the link, and
the one end of the link is connected to the distal end of the swing arm.

* * * * *